(12) United States Patent
Zhu

(10) Patent No.: US 8,967,369 B2
(45) Date of Patent: Mar. 3, 2015

(54) TRANSFERRING APPARATUS

(71) Applicant: Shenzhen China Star Optoelectronics Technology Co., Ltd., Shenzhen, Guangdong (CN)

(72) Inventor: Meina Zhu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 115 days.

(21) Appl. No.: 13/813,941

(22) PCT Filed: Dec. 21, 2012

(86) PCT No.: PCT/CN2012/087110
§ 371 (c)(1),
(2) Date: Feb. 1, 2013

(87) PCT Pub. No.: WO2014/086064
PCT Pub. Date: Jun. 12, 2014

(65) Prior Publication Data
US 2014/0151190 A1    Jun. 5, 2014

(30) Foreign Application Priority Data
Dec. 4, 2012  (CN) .................... 2012 2 0659846 U

(51) Int. Cl.
*B65G 45/26* (2006.01)
*B65G 45/10* (2006.01)

(52) U.S. Cl.
CPC ..................... *B65G 45/10* (2013.01)
USPC ........................................... 198/494

(58) Field of Classification Search
CPC .......... B65G 2249/02; B65G 2249/04; B65G 45/10; B65G 45/26; H05K 3/00; G02F 1/1333
USPC .................................. 198/493, 494
See application file for complete search history.

(56) References Cited

U.S. PATENT DOCUMENTS

| 3,717,119 | A | * | 2/1973 | Boys et al. ................. 198/346.2 |
| 3,973,665 | A | * | 8/1976 | Giammanco ................. 198/775 |
| 2010/0272550 | A1 | * | 10/2010 | Ishihara et al. ............... 414/777 |
| 2011/0005903 | A1 | * | 1/2011 | Niewiera ...................... 198/791 |

FOREIGN PATENT DOCUMENTS

CN        201010291        1/2008

OTHER PUBLICATIONS

International Search Report issued for PCT application No. PCT/CN2012/087110 by the State Intellectual Property Office of China.

* cited by examiner

Primary Examiner — James R Bidwell

(57) ABSTRACT

The present disclosure provides a transferring apparatus, which includes a driving device, a number of guiding rollers arranged on two sides of the driving device and a number of vacuum cleaners arranged on the guiding rollers. The transferring apparatus of the present disclosure can remove the impurities generated in the transferring process of the substrate when transferring the substrate, which eliminates the bad effect on the following manufacturing processes of the substrate caused by the impurities generated in the transferring process of the substrate.

16 Claims, 3 Drawing Sheets

TRANSFERRING APPARATUS

BACKGROUND

1. Technical Field

The present disclosure relates to liquid crystal displaying technologies, and particularly, to a transferring apparatus for a substrate of a liquid crystal panel.

2. Description of Related Art

In the manufacturing process of a liquid crystal panel, a substrate of the liquid crystal panel goes through a number of processes in a number of manufacturing device. The substrate is transferred from one device to another device using a transferring apparatus. The transferring apparatus generally includes a number of driving shafts, a number of driving rollers arranged at the driving shafts, and a number of guiding rollers. The guiding rollers are respectively rotatably located at two sides of the driving shafts. The driving shafts drive the driving rollers to rotate, thereby driving the substrate to move. The guiding rollers correspond to two sides of the substrate. When the substrate is driven to move by the driving rollers, the guiding rollers correspond to two sides of the substrate; when the moving direction of the substrate deviates, the substrate contacts the guiding rollers, thus the moving direction of the substrate is changed by the rotations of the guiding rollers. Since in the process of adjusting the moving direction of the substrate by the rotations of the guiding rollers, friction is occurred between the guiding rollers and the substrate, therefore, impurities such as fragments may be generated due to the wearing of the guiding rollers or due to the friction between the substrate and the guiding rollers. The impurities may be stuck to the surface of the substrate easily. The impurities on the surface of the substrate will have a bad effect on the following manufacturing processes of the substrate, for example, causes disconnected defects or short circuits of single lines or even causes the waste of the substrate.

Therefore, removing the impurities generated in the transferring process of the substrate has become a problem occurred in the manufacturing process of the liquid crystal panel which is required to be solved urgently.

SUMMARY

The present disclosure provides transferring apparatus which can remove impurities generated in the transferring process of a substrate and further avoid bad effect on the following processes of the substrate caused by the impurities.

The transferring apparatus provided in an embodiment includes: a driving device; a number of guiding rollers arranged at two sides of the driving device; and a number of vacuum cleaners arranged above the guiding rollers.

Preferably, each of the vacuum cleaners includes a sucker and an air suction device, the sucker is located above the corresponding guiding roller and the driving device; a number of through holes are formed in the sucker; and the air suction device communicates with the through holes.

Preferably, an area of the sucker is greater than that of a cross section of the corresponding guiding roller.

Preferably, the through holes are right above an edge of the corresponding guiding roller.

Preferably, the transferring apparatus further includes a rotating rod to which each guiding roller and the corresponding sucker are fixed side by side.

Preferably, the guiding roller is cylinder shaped, the sucker is disc shaped, and the rotating rod corresponds to axis positions of the guiding roller and the sucker.

Preferably, the transferring apparatus further includes a base at which the driving device and the guiding rollers are arranged.

Preferably, the driving device includes a rotating shaft rotatably connected to the base, the rotating shaft is perpendicular to the rotating rod, and a number of rollers are arranged on each of the rotating shafts.

Preferably, the guiding roller is made of polyethylene or poly.

The present disclosure further provides another transferring apparatus for transferring a substrate, including:

a driving device with the substrate placed thereon;

a number of guiding rollers arranged at two sides of the driving device; the guiding rollers corresponding to two sides of the substrate and being spaced from a corresponding edge of the substrate for a predetermined distance; and a number of vacuum cleaners arranged on the guiding rollers and located above the guiding rollers.

Preferably, each of the vacuum cleaners includes a sucker and an air suction device, the sucker is located above the corresponding guiding roller and the driving device; a number of through holes are formed in the sucker; and the air suction device communicates with the through holes.

Preferably, an area of the sucker is greater than that of a cross section of the guiding roller.

Preferably, the through holes are right above an edge of the corresponding guiding roller.

Preferably, the transferring apparatus further includes a rotating rod to which each guiding roller and the corresponding sucker are fixed side by side.

Preferably, the guiding roller is cylinder shaped, the sucker is disc shaped, and the rotating rod corresponds to axis positions of the guiding roller and the sucker.

Preferably, the transferring apparatus further includes a base at which the driving device and the guiding rollers are arranged.

Preferably, the driving device includes a rotating shaft rotatably connected to the base, the rotating shaft is perpendicular to the rotating rod, and a number of rollers are arranged on each of the rotating shafts.

Preferably, the guiding roller is made of polyethylene or poly.

When the transferring apparatus transfers the substrate, the rotating shafts are controlled to rotate. The rollers rotate as the rotating shafts rotate, thereby driving the substrate to move. At the same time, each vacuum air suction device is turned on to suck air around the corresponding guiding roller through the through holes. Therefore, when the substrate rubs the guiding rollers and generates impurities due to the deviation of the moving direction of the substrate, the impurities are sucked into the through holes, which removes the impurities on the guiding roller and on the edge of the substrate, and eliminates the bad effect on the following manufacturing processes of the substrate caused by the impurities generated in the transferring process of the substrate.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
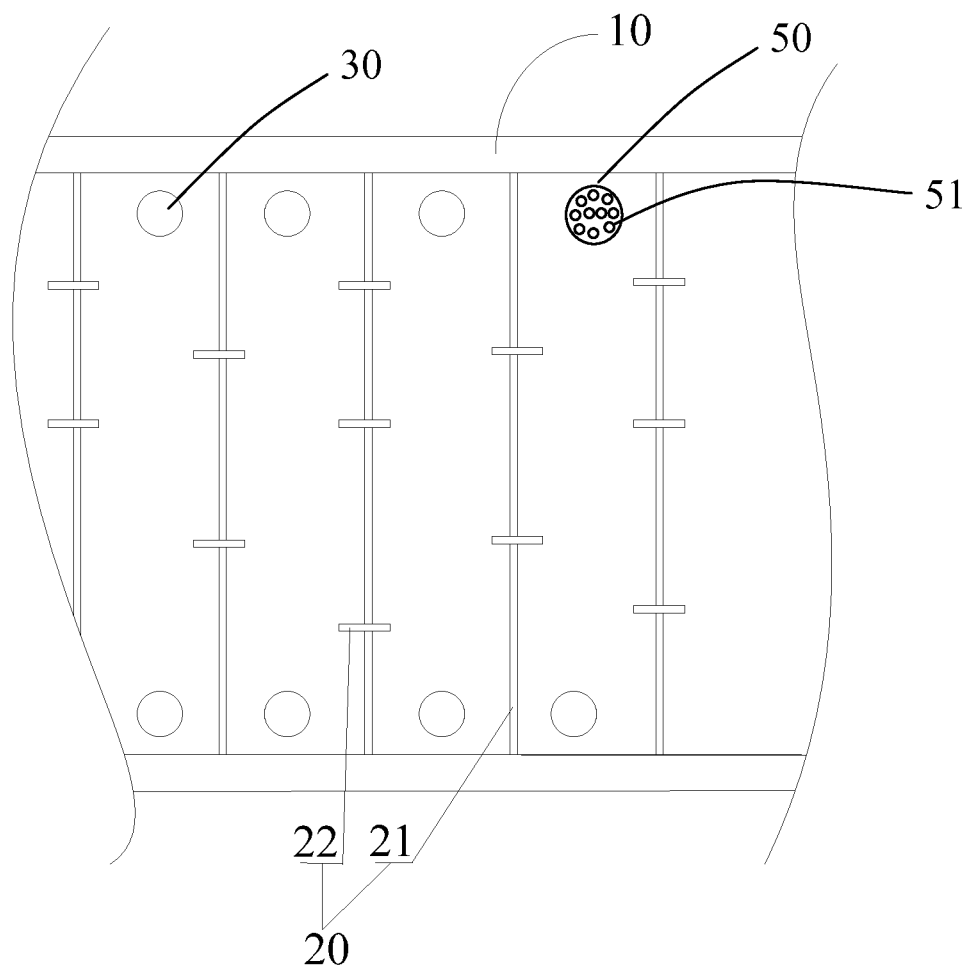
FIG. 1 is a schematic view illustrating a transferring apparatus in accordance with an embodiment of the present disclosure, with only a vacuum cleaner being shown.
Figure 2:
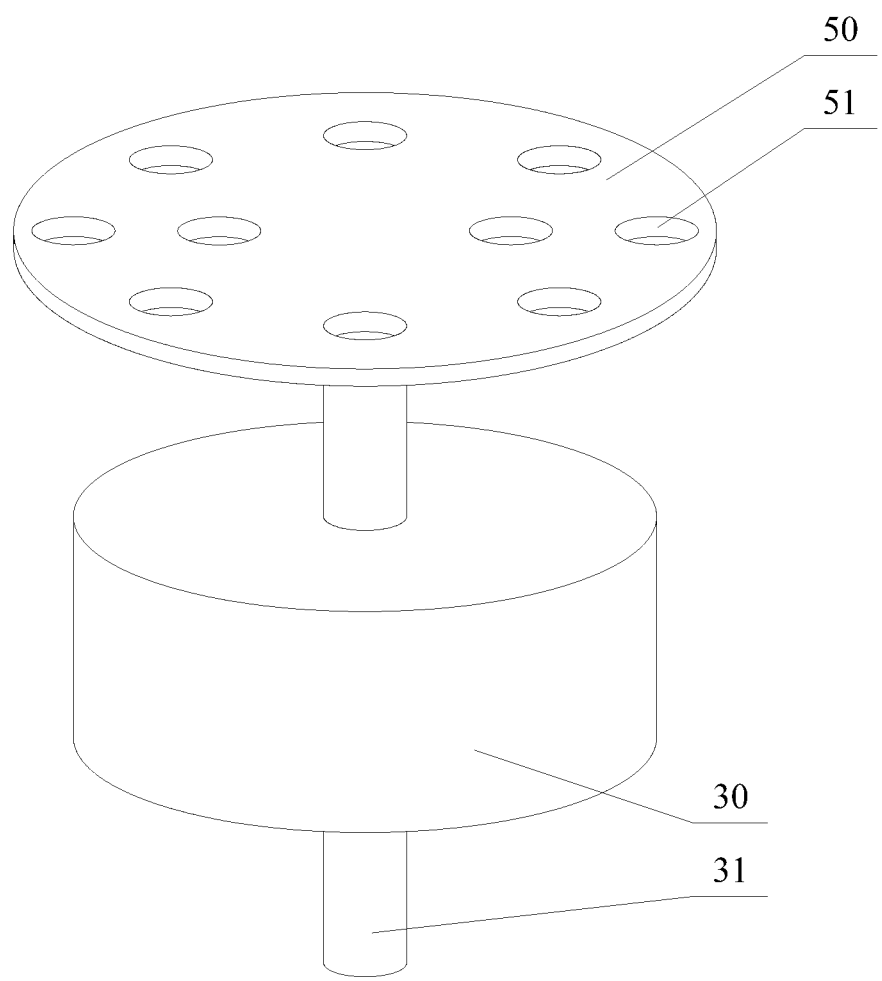
FIG. 2 is a schematic view illustrating a guiding roller and a sucker of FIG. 1.

Referring to FIGS. 1 and 2, in which FIG. 1 is a schematic view illustrating a transferring apparatus in accordance with an embodiment of the present disclosure, and FIG. 2 is a schematic view illustrating a guiding roller and a sucker of FIG. 1.

The transferring apparatus in the present embodiment includes a base 10, a driving device 20 arranged on the base 10, a number of guiding rollers 30 arranged at two sides of the driving device 20, and a number of vacuum cleaners.

The driving device 20 includes a number of rotating shafts 21 rotatably connected to the base 10. A number of rollers 22 are arranged on each rotating shaft 21 to form a roller matrix. In the embodiment, the number of the rotating shafts 21 and the number of rollers 22 on each rotating shaft 21 can be set according to requirements. The rollers 22 on two adjacent rotating shafts 21 are respectively misaligned with each other.

The guiding rollers 30 correspond to two sides of the roller matrix by a number of rotating rods 31 which respectively pass through the guiding rollers 30. The rotating rods 31 are rotatably fixed to the base 10.

Each of the vacuum cleaners includes a sucker 50 and an air suction device (not shown). The sucker 50 and the corresponding guiding roller 30 are fixed to the corresponding rotating rod 31 side by side, and the sucker 50 is located above the guiding roller 30. In the embodiment, each guiding roller 30 is cylinder shaped. The rotating rod 31 corresponds to axis positions of the corresponding guiding roller 30 and the corresponding sucker 50, and a diameter of the guiding roller 30 is less than that of the sucker 50. A number of through holes 51 communicating with the corresponding air suction device are formed in each sucker 50. Preferably, the through holes 51 are formed at positions of the sucker 50 right above an edge of the corresponding guiding roller 30.

It is noted that the vacuum cleaner can be respectively arranged on all the guiding rollers 30, or the vacuum cleaners may be respectively arranged on some of the guiding rollers 30, for example, the vacuum cleaners may be respectively arranged on the guiding rollers 30 corresponding to an output end of the driving device 20.

In the embodiment, the rotating rod 31 is fixed to the corresponding guiding roller 30 and is rotatably connected to the base 10, and the rotating rod 31 corresponds to the axis position of the corresponding guiding roller 30. For example, the base 10 can be provided with a bearing (not shown) which includes an inner ring and an outer ring with a number of balls between the inner ring and the outer ring. The rotating rod 31 is fixed to the inner ring of the bearing and the outer ring of the bearing is connected to the base 10, thereby allowing the guiding roller 30 to rotate around the corresponding rotating rod 31. The number of the through holes 51 formed in the sucker 50 can be set according to requirements, which is not limited here.

It is noted that each guiding roller 30 can be made of polyethylene or poly(ether-ether-ketone), which improves the wearability of the guiding roller 30.

Figure 3:
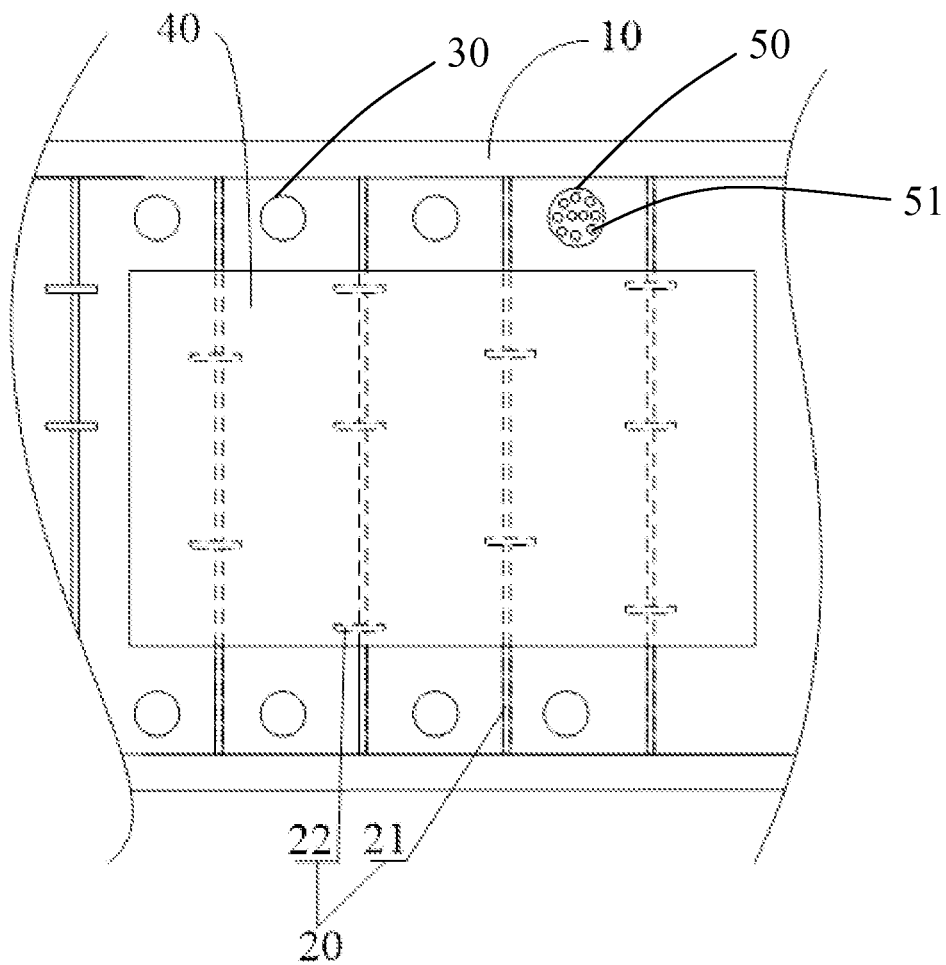
FIG. 3 is a schematic view illustrating that the transferring apparatus of FIG. 1 transfers a substrate, with only a vacuum cleaner being shown.

Referring also to FIG. 3, which is a schematic view illustrating that the transferring apparatus of FIG. 1 transfers a substrate. A substrate 40 is placed on the driving device 20. The rollers 22 supports the substrate 40 and the guiding rollers 30 correspond to two sides of the substrate and are spaced from a corresponding edge of the substrate 40 for a predetermined distance. The vacuum cleaners are respectively located above the guiding rollers 30. When the transferring apparatus transfers the substrate, the rotating shafts 21 are controlled to rotate. The rollers 22 rotate as the rotating shafts 21 rotate, thereby driving the substrate 40 to move. At the same time, each vacuum air suction device is turned on to suck air around the corresponding guiding roller 30 through the through holes 51. Therefore, when the substrate 40 rubs the guiding rollers 30 and generates impurities due to the deviation of the moving direction of the substrate 40, the impurities are sucked into the through holes 51, which removes the impurities on the guiding roller 30 and on the edge of the substrate 40 and eliminates the bad effect on the following manufacturing processes of the substrate caused by the impurities generated in the transferring process of the substrate 40.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A transferring apparatus, comprising:
    a driving device;
    a number of guiding rollers arranged at two sides of the driving device; and
    a number of vacuum cleaners arranged above the guiding rollers;
    wherein each of the vacuum cleaners comprises a sucker and an air suction device, the sucker is located above the corresponding guiding roller and the driving device; a number of through holes are formed in the sucker; and the air suction device communicates with the through holes.

2. The transferring apparatus according to claim 1, wherein an area of the sucker is greater than that of a cross section of the corresponding guiding roller.

3. The transferring apparatus according to claim 1, wherein the through holes are right above an edge of the corresponding guiding roller.

4. The transferring apparatus according to claim 1 further comprising a rotating rod to which each guiding roller and the corresponding sucker are fixed side by side.

5. The transferring apparatus according to claim 4, wherein the guiding roller is cylinder shaped, the sucker is disc shaped, and the rotating rod corresponds to axis positions of the guiding roller and the sucker.

6. The transferring apparatus according to claim 5 further comprising a base at which the driving device and the guiding rollers are arranged.

7. The transferring apparatus according to claim 6, wherein the driving device comprises a rotating shaft rotatably connected to the base, the rotating shaft is perpendicular to the rotating rod, and a number of rollers are arranged on each of the rotating shafts.

8. The transferring apparatus according to claim 1, wherein the guiding roller is made of polyethylene or poly.

9. A transferring apparatus for transferring a substrate, comprising:
 a driving device with the substrate placed thereon;
 a number of guiding rollers arranged at two sides of the driving device; the guiding rollers corresponding to two sides of the substrate and being spaced from a corresponding edge of the substrate for a predetermined distance; and
 a number of vacuum cleaners arranged on the guiding rollers and located above the guiding rollers;
 wherein each of the vacuum cleaners comprises a sucker and an air suction device, the sucker is located above the corresponding guiding roller and the driving device; a number of through holes are formed in the sucker; and the air suction device communicates with the through holes.

10. The transferring apparatus according to claim 9, wherein an area of the sucker is greater than that of a cross section of the guiding roller.

11. The transferring apparatus according to claim 9, wherein the through holes are right above an edge of the corresponding guiding roller.

12. The transferring apparatus according to claim 9 further comprising a rotating rod to which each guiding roller and the corresponding sucker are fixed side by side.

13. The transferring apparatus according to claim 12, wherein the guiding roller is cylinder shaped, the sucker is disc shaped, and the rotating rod corresponds to axis positions of the guiding roller and the sucker.

14. The transferring apparatus according to claim 13 further comprising a base at which the driving device and the guiding rollers are arranged.

15. The transferring apparatus according to claim 14, wherein the driving device comprises a rotating shaft rotatably connected to the base, the rotating shaft is perpendicular to the rotating rod, and a number of rollers are arranged on each of the rotating shafts.

16. The transferring apparatus according to claim 9, wherein the guiding roller is made of polyethylene or poly.

* * * * *